Patented Apr. 1, 1930

1,753,010

UNITED STATES PATENT OFFICE

ADAM HOCHE, OF LYNN, MASSACHUSETTS, ASSIGNOR TO LITMO ADHESIVE & PRODUCTS COMPANY, OF LYNN, MASSACHUSETTS, A CORPORATION OF MASSACHUSETTS

MOLDABLE COMPOSITION

No Drawing.      Application filed October 11, 1922. Serial No. 593,881.

This invention has for its ultimate object the production of molded products or articles for use in the various arts. It consists of not only in the final molded products but also in the process by which the products are produced and the combinations of the various ingredients which may be utilized in carrying out the process.

The character of the final product depends in large measure upon the bulky material or filler which is employed, i. e. whether it is organic in its nature such as sawdust, wood pulp, etc., or inorganic such as sand, talc, infusorial earth or the like. With such organic or inorganic filler, there is employed a binder comprising cupra-ammonium and resinous bodies. In addition to these last-mentioned ingredients, I may also employ methyl alcohol for reaction with the oxide of copper, as well as for more or less dissolving the resinous bodies.

As illustrating how my process may be practiced for producing molded products useful in the various arts, I may cite the following examples:

I. Cupra-ammonium is first produced by dissolving 1 part, by weight, of copper hydrate in 5 parts of saturated aqua-ammonia. With this is mixed 54 parts of sawdust, wood pulp or other cellulosic material, until a substantially physically homogeneous mass is formed. Then I add to and thoroughly mix with the mass 18 parts of a powdered resinous body or gum, such for example as asphaltum, rosin, copal, sandarac, mastic, dammar or synthetic resins. The cupra-ammonium dissolves more or less of the cellulosic material forming cupra-ammonium cellulose, and the ammonia softens and more or less dissolves the gum or resinous body. Thus a binder is produced comprising the cellulose in solution and the softened or more or less dissolved gum. The mass is now molded under pressure and at a temperature of 210° to 500° F., in molds shaped to produce the desired article.

II. One may proceed as in the first example, and then, when the resinous body is added to the previous ingredients, 6 parts by weight of methyl alcohol are thoroughly stirred into the mass. In this case, the wood alcohol assists in dissolving the resinous body or bodies, and in addition undoubtedly reacts with the oxide of copper to form formaldehyde at the molding temperature which in turn, reacting with the ammonia, forms hexamethylentetramine. This last-named ingredient, I believe, combines with the acids of the gums to form synthetic gums or resins.

The moldable material thus produced may be molded under heat and pressure. Thus one may produce switch or panel boards, battery cells, insulators and other products where electrical non-conductivity of a high order is desired or required. In fact, one may thus form many articles which are ordinarily formed of wood, such as water closet seats and covers, boxes and receptacles of various kinds, etc.

III. In lieu of cellulosic material, such as recited in Examples I and II, there may be substituted an inorganic filler. Thus, in producing a moldable material or composition where the final product should possess fire-resistant properties, one may proceed as follows: 18 parts, by weight, of powdered gum or resinous body (e. g. copal, asphaltum, rosin, phenol resin or the like) are thoroughly mixed with 120 parts of an inorganic or mineral filler, such for example as infusorial earth, sand, clay, marble or the like, in a finely divided condition. To this mixture is then added 6 parts of calcium hydrate, and then 6 parts of cupra-ammonium. I preferably then add and mix into the mass 18 parts of methyl alcohol. In this case, the gums are dissolved more or less by the ammonia and the copper oxide reacts with the methyl alcohol with the formation of formaldehyde. Formaldehyde reacts with calcium oxide with the formation of fructose, a more or less sticky sugar. The ammonia reacts with the excess formaldehyde to form hexamethylentetramine, which reacts with the acids of the gums to form a synthetic gum just as in the second example hereinbefore given.

I have not attempted to set forth all of the various cellulosic materials which may be utilized in the first and second examples, or all of the various inorganic fillers which may be used in carrying out the process according to the third example. Of course it will be understood that, while I have stated the proportions of the various ingredients, one may vary the proportions more or less without greatly affecting the final product.

The molded articles or products produced are dense, hard, capable of being polished, and lend themselves to a great variety of uses. While it is not essential in every case that methyl alcohol should be added as described in Examples II and III, nevertheless beneficial results are secured by its use. The reaction between formaldehyde and ammonia is exorthermic, and the heat given off assists in drying the mass in the molding operation so that it is uniform throughout. A further advantage is secured by the formation of hexamethylentetramine. Certain acids of the gums, which might be lost by evaporation, combine therewith to form synthetic gums. The final molded product is waterproof and may take the form of artificial shingles or clapboards, and, when the filler is inorganic, is fireproof.

What I claim is:

1. A composition moldable under heat and pressure comprising cupra-ammonium, a resinous body and a filler.

2. A composition moldable under heat and pressure comprising cupra-ammonium, a resinous body, methyl alcohol and a filler.

3. A composition moldable under heat and pressure comprising cupra-ammonium, a resinous body, and a cellulosic material.

4. A composition moldable under heat and pressure comprising cupra-ammonium, a resinous body, methyl alcohol, and a cellulosic material.

5. A process of producing molded articles, which comprises mixing together a filler, cupra-ammonium and a resinous body, and subjecting the mass to heat and pressure.

6. A process of producing molded articles, which comprises mixing together a filler, cupra-ammonium, a reactive resinous body and methyl alcohol, and subjecting the resultant mass to a molding operation under pressure and heat sufficient to cause the formation of formaldehyde.

7. A process of producing molded articles, which comprises mixing together cupra-ammonium, a resinous body, and a cellulosic material, and subjecting the resultant mass to a molding operation under heat and pressure.

8. A process of producing molded articles, which comprises mixing with a cellulosic material cupra-ammonium, a reactive resinous body and methyl alcohol, and subjecting the resulting mass to pressure and heat sufficient to cause the formation of formaldehyde.

9. A composition moldable under heat and pressure, comprising cupra-ammonium, cupra-ammonium cellulose, cellulosic material, and a resinous body.

10. A composition moldable under heat and pressure, comprising cupra-ammonium, a resinous body, and cellulose pulp.

11. A process of producing moulded articles, which comprises mixing together cupra-ammonium, a resinous body, and a cellulosic material, and molding the resultant mass under pressure and at a temperature of about 210° to 500° F.

In testimony whereof I have affixed my signature.

ADAM HOCHE